(12) United States Patent
Wavreille et al.

(10) Patent No.: US 11,407,640 B2
(45) Date of Patent: Aug. 9, 2022

(54) METHOD FOR ETCHING A PHOSPHATE SOURCE USING ACID

(71) Applicants: PRAYON TECHNOLOGIES, Engis (BE); Raphael Etienne Lederer, Scottsdale, AZ (US); Robert Edouard Lederer, Scottsdale, AZ (US)

(72) Inventors: Alexandre Wavreille, Engis (BE); Livio Lederer, Brussels (BE); Léon Ninane, Combrit (FR)

(73) Assignee: PRAYON TECHNOLOGIES, Engis (BE)

(*) Notice: Subject to any disclaimer, the term of this patent is extended or adjusted under 35 U.S.C. 154(b) by 183 days.

(21) Appl. No.: 16/637,254

(22) PCT Filed: Aug. 10, 2018

(86) PCT No.: PCT/EP2018/071818
§ 371 (c)(1),
(2) Date: Feb. 6, 2020

(87) PCT Pub. No.: WO2019/030403
PCT Pub. Date: Feb. 14, 2019

(65) Prior Publication Data
US 2020/0165133 A1 May 28, 2020

(30) Foreign Application Priority Data
Aug. 11, 2017 (BE) .................................. 2017/5554

(51) Int. Cl.
*C01B 25/32* (2006.01)
(52) U.S. Cl.
CPC .......... *C01B 25/324* (2013.01); *C01B 25/327* (2013.01)
(58) Field of Classification Search
CPC .............................. C01B 25/324; C01B 25/327
USPC ....................................................... 423/157.3
See application file for complete search history.

(56) References Cited

U.S. PATENT DOCUMENTS

| | | | | |
|---|---|---|---|---|
| 4,088,738 A | * | 5/1978 | Hauge | C01F 11/46 423/319 |
| 4,132,760 A | * | 1/1979 | Ore | C01B 25/22 423/157.4 |
| 4,154,799 A | * | 5/1979 | Hauge | C01B 25/324 423/157.4 |
| 4,393,032 A | * | 7/1983 | Drechsel | C01B 25/322 423/166 |
| 4,479,923 A | * | 10/1984 | Sardisco | C01B 25/322 423/166 |
| 4,524,057 A | * | 6/1985 | Bigot | C01B 25/22 423/555 |
| 4,588,570 A | * | 5/1986 | Davister | C01F 11/466 423/320 |
| 4,777,027 A | * | 10/1988 | Davister | C01B 25/222 423/157.4 |
| 6,620,395 B1 | * | 9/2003 | Mantel | C01B 25/22 423/321.1 |
| 9,371,230 B2 | * | 6/2016 | Hoxha | C01B 25/222 |
| 10,662,072 B2 | * | 5/2020 | Henry | C01F 11/46 |
| 2003/0161778 A1 | * | 8/2003 | De Waal | C01B 25/328 423/305 |

FOREIGN PATENT DOCUMENTS

| | | | | | |
|---|---|---|---|---|---|
| AU | 3574271 A | * | 5/1973 | | C01B 25/22 |
| BE | 696519 A | * | 9/1967 | | C01B 25/22 |
| BE | 856582 A | * | 1/1978 | | A61K 9/007 |
| CN | 106348266 A | | 1/2017 | | |
| DE | 102014006278 B3 | * | 2/2015 | | C05B 17/00 |
| GB | 793 801 A | | 4/1958 | | |
| WO | WO-0017100 A1 | * | 3/2000 | | C01B 25/324 |
| WO | 2004/002888 A2 | | 1/2004 | | |
| WO | WO-2005087661 A1 | * | 9/2005 | | C01B 25/32 |
| WO | WO-2015082468 A1 | * | 6/2015 | | A23L 33/16 |
| WO | WO-2017220718 A1 | * | 12/2017 | | C01F 11/46 |

OTHER PUBLICATIONS

Qadir, M.A., et al., "Synthesis of Dicalcium Phosphate Used as Feed Additive for Animals From Phosphate Rock as Potential Cost-Effective Raw Material," International Journal of Chemical Scienses 12(1):111-120, 2014.

International Search Report dated Sep. 19, 2018, issued in corresponding International Application No. PCT/EP2018/071818, filed Aug. 10, 2018, 6 pages.

Database WPI, 0, Derwent World Patents Index, vol. 2017, No. 23, Database accession No. 2017-09705U, XP002780455 & CN106348266 A 20170125 (Guizhou Chanhen Chem Corp) [A] 1-15 * abstract *.

* cited by examiner

*Primary Examiner* — Melissa S Swain
(74) *Attorney, Agent, or Firm* — Christensen O'Connor Johnson Kindness PLLC

(57) ABSTRACT

Process of acid attack with sulphuric acid of a phosphate source comprising calcium or not comprising calcium for a predetermined time period ranging from 20 to 180 minutes in the conditions wherein the molar ratio of sulphate from the sulphuric acid and possibly from the phosphate source to the calcium present in the phosphate source ranges from 0.6 to 0.8, and the content in $P_2O_5$ in the attack tank is of less than 6%.

13 Claims, No Drawings

METHOD FOR ETCHING A PHOSPHATE SOURCE USING ACID

The present invention relates
to a process of acid attack of a phosphate source comprising calcium and
to a process of acid attack of a phosphate source that does not comprise calcium
for the production of a phosphate-based purified compound.

By "phosphate source that does not comprise calcium", it is meant a content of calcium bonded or not to a phosphate ion, hydrogen phosphate ion and/or dihydrogen phosphate ion of less than 10% by weight, preferably less than 5% by weight, preferably 1% by weight, more preferably 0.1% by weight and even more preferably 0.05% by weight or less with respect to the total weight of the dry matter of the phosphate source (105° C. dry).

Phosphate sources that do not contain bonded calcium include, for example, iron phosphate, aluminium phosphate, lithium phosphate, zinc phosphate, magnesium phosphate or mixed phosphates. In this embodiment, calcium is added to the phosphate source to achieve a $SO_4/Ca$ molar ratio ranging from 0.6 to 0.8 in the attack tank.

Acid attacks of a phosphate source comprising calcium are well known by the state of the art.

A traditional process of a similar nature consists in making to react a phosphate rock with sulphuric acid in conditions that give rise to the crystallisation of calcium sulphate dihydrate or gypsum ($CaSO_4.2H_2O$). The gypsum slurry obtained in a first reactor can then undergo, in a second reactor, a maturation process that increases the size of formed sulphate grains, for the purpose of increasing filterability. The matured slurry is then filtered to obtain phosphoric acid with a content of free $P_2O_5$ of around 25 to 35% by weight.

We also know phosphoric acid production through a sulphuric acid attack to give, at higher temperatures and concentrations of $P_2O_5$ and/or of $SO_3$, a slurry of calcium sulphate in the form of a hemihydrate ($CaSO_4.½H_2O$) or of an anhydrite. These processes generally yield concentrated phosphoric acid and an easily-filterable sulphate, but the extraction efficiency of $P_2O_5$ in these processes is not as good as in the traditional process. After the acid attack, in certain cases the obtained calcium sulphate hemihydrate is converted to calcium sulphate dihydrate (Ullman's Encyclopaedia of Industrial Chemistry, 2008, pages 8 and 9).

We also know a process whereby the phosphate rock is once again subjected to the attack conditions according to the traditional process to achieve a first slurry in which the formed gypsum features a grain size that provides for good filtration. A part of this first slurry is then sampled and subjected to conditions in which gypsum is converted to hemihydrate, thereby forming a second slurry. The rest of the first slurry is them mixed to the second, and the resulting slurry is filtered (see WO 2005/118470).

A major problem affecting the production of phosphoric acid resides in the depletion of $P_2O_5$-rich mineral deposits. These deposits have been exploited. We must now rely on minerals featuring a $P_2O_5$ content that is considered to be poor, for example with a $P_2O_5$ content of 25% by weight or less with respect to the phosphate rock, or in certain cases of 20% or less.

A process allowing to use these minerals and to extract therein high-quality production phosphoric acid was described in the international patent application WO2011/067321. The attack conditions of this process include a significantly stoichiometric reaction between the introduced sulphuric acid and the calcium contained in the phosphate rock, whereas the free $P_2O_5$ content in the crystallisation slurry is maintained high at between 38 and 50% by weight and the temperature is maintained at 70 to 90° C. Surprisingly, these conditions give rise to very fine and stable dihydrate crystals. This slurry is then subjected to a temperature increase during which the dihydrate grains solubilise and release non-attacked or co-crystallised $P_2O_5$, while the crystallisation of calcium sulphate hemihydrate with good filterability and production phosphoric acid with a very low content of free $SO_3$ are achieved. It should be noted that minerals with poor $P_2O_5$ content frequently feature increasingly high impurity content. The impurity content is commonly expressed as the ratio $(Al_2O_3+Fe_2O_3+MgO)/P_2O_5 \times 100$, also called MER (Minor Element Ratio). Phosphates which are said to be classic, are characterised by a MER ratio ranging from about 5 to 8.

Beyond 10, the impurity content is so important that it begins to negatively affect the crystallisation of the calcium sulphate in the form of gypsum during the attack of the mineral by sulphuric acid. At this level of impurity content, the production of phosphoric acid becomes problematic, in particular because of issues affecting the crystallisation of calcium sulphate dihydrate and the filtration thereof. This is therefore a significant disadvantage in all the processes where filtration occurs directly after the attack of the phosphate rock.

In a process such as described in patent application WO2011/067321, the gypsum crystallisation is also affected by impurities, but as the gypsum is not intended to be filtered, this is inconsequential.

The document WO2012/163425 aims at developing a phosphoric acid production process via attack of a phosphate rock of poor quality using sulphuric acid to allow to obtain a high-quality production phosphoric acid and a good extraction efficiency of $P_2O_5$ from the rock. The process must furthermore be able to be applicated in existing and traditional facilities, and not require costly transformations that are impossible to justify economically. According to that document, the process comprises, in the course of the attack, an addition of a fluorine source in the first slurry with a content ranging from 1 to 5% by weight of F with respect to the $P_2O_5$ contained in the phosphate rock. The attack conditions are such that they provide for a substantially stoichiometric reaction between the introduced sulphuric acid and the calcium contained in the phosphate rock, primarily in the form of carbonate and calcium phosphate. The acid aqueous phase of the first slurry resulting from the attack contains no or very little free sulphuric acid and its content in free $P_2O_5$ is relatively high.

As can be seen, the difficulty in producing phosphoric acid from phosphate rocks is to always have a sufficient attack yield, an acid of acceptable quality and calcium sulphate that is more or less easy to valorise and, in this context, it is generally accepted that the attack of phosphate rocks with concentrated sulphuric acid must be conducted as a stoichiometric reaction in order to produce a raw phosphoric acid and to ensure an extraction rate of $P_2O_5$ that is sufficient and economically profitable.

In the case of the production of phosphoric acid by an attack of phosphate rocks with sulphuric acid by stoichiometric reaction, the reaction is written:

(I) $Ca_3(PO_4)_2 + 3H_2SO_4 \rightarrow 3\ CaSO_4.2H_2O + 2\ H_3PO_4$
In which the molar ratio $SO_4/Ca=3/3$, i.e.=1

It is also known that the phosphoric acid thus produced can be used in combination with a lime base to produce food grade (for humans or animals) dicalcium phosphate (DCP) or for any other application.

Document GB-938468 describes the production of monocalcium phosphate (MCP) or dicalcium phosphate (DCP) from phosphate rocks or from natural minerals with hydrochloric acid.

Document WO 2015/082468 describes a hydrochloric acid attack of phosphate rocks.

Unfortunately, the hydrochloric acid attack processes require a DCP cleaning step to eliminate chloride ions that should not, for example, be present in certain grades of technical DCP. Processes using hydrochloric acid generate residual calcium chloride in which part of the impurities of the raw material will accumulate. This solution requires additional purification treatments for it to be implemented. Furthermore, the presence of hydrochloric acid in the attack tank creates corrosion problems in facilities when the temperature is superior or equal to 60° C.

We also know from document U.S. Pat. No. 3,161,466 an attack process of phosphate rocks using sulphuric acid. In the process described in this document, a first sulphuric acid attack is conducted in an attack tank to obtain a pasty slurry, which can be left to mature or be transferred to a second tank where it will undergo an additional acid attack. This process is based on a sequential pH control, incremental pH increases serving to selectively precipitate different impurities present in the liquid phase (liquor). The liquor contains MCP and phosphoric acid in high quantities.

Unfortunately, the process described is limiting as it requires rigorous pH controls at each step because of the abovementioned selective precipitation, but also as it is economically unsound due to the numerous steps involved and the time required to treat the phosphate rock.

Finally, another process is described in document GB793801. In this document, the described process comprises a sub-stoichiometric attack of phosphate rocks with sulphuric acid concentrated at 14 to 62%. The purpose of the described process is the retrieval of rare earths contained in the phosphate rock. Consequently, one of the critical steps resides in the full dissolution of the phosphate rock to form a liquid phase from which the rare earths can be extracted. The process therefore comprises the addition of reactive silica to maintain the rare earths in solution, and requires an attack time period of approximately 24 hours. The content of $P_2O_5$ with respect to the calcium ($P_2O_5$/Ca) disclosed in the document ranges from 10/1 to 4/1.

As can be seen, the process is time-consuming and involves a significant cost to treat the phosphate rock, owing to the fact that the process is probably made profitable by the extraction of rare earths that feature a significant market value. However, in an approach aiming to produce a purified phosphate-based matter, economic profitability of this process must be put into question.

The purpose of the invention is to remedy the disadvantages of the state of the art by providing an economically profitable process with optimal balance between the energy cost, the production cost, the resistance of the materials used in production devices, and the flexibility of the raw materials.

Indeed, one of the purposes of this invention is to provide a process allowing the treatment of rocks with a high phosphate concentration, as well as of rocks with a low phosphate concentration and secondary phosphate sources.

To solve this problem, the invention relates to a process of acid attack of a phosphate source comprising calcium for the production of a purified phosphate-based compound such as mentioned at the beginning, comprising the steps of a) an acid attack with sulphuric acid of said phosphate source during a predetermined time period ranging from 20 to 180 minutes with formation of a first suspension containing a first solid matter and a first liquid phase in which the first solid matter is in suspension, said first solid matter comprising at least calcium phosphate and impurities, said first liquid phase comprising phosphoric acid and dissolved monocalcium phosphate, said attack being conducted in input conditions wherein the molar ratio of the sulphate from the sulphuric acid and possibly from the phosphate source to the calcium is comprised between 0.6 and 0.8 and the $P_2O_5$ content is of less than 6%, b) a first filtration of said first slurry with a separation of said first solid matter from said first liquid phase, and c) a retrieval from said first liquid phase of a purified phosphate-based compound. The molar ratio $SO_4/Ca$ defines the quantity of acid required for the attack of the phosphate source containing the Ca at the input of the reagents. Advantageously, said $P_2O_5$ content is a content of $P_2O_5$ dissolved in said first liquid phase.

Advantageously, said acid attack takes place in 1, 2 or more attack tanks.

As can be seen, the process according to the present invention is an attack process in strongly sub-stoichiometric conditions, as the molar ratio of the sulphate from the sulphuric acid and possibly from the phosphate source to the calcium ($SO_4/Ca$) present in the phosphate source being comprised between 0.6 and 0.8 features several advantages. Firstly, the consumption of sulphuric acid is reduced and a plurality of phosphate sources can be treated by the process according to the present invention for the purpose of producing various purified phosphate-based compounds. Indeed, the process according to the present invention can be used to obtain a liquid phase that contains phosphoric acid and monocalcium phosphate from which the dicalcium phosphate can also be obtained, thereby providing great flexibility. Indeed, dicalcium phosphate can be attacked to produce relatively pure phosphoric acid and its derivatives. Furthermore, the attack time period is relatively short, thereby lowering the production costs by the joint action of flexibility relating to the phosphate source and the plurality of obtained products. Maintenance costs can also be lowered owing to the reduced aggressiveness of the reaction environment.

To reach the molar ratio of sulphate from the sulphuric acid and possibly from the source of phosphate to the calcium, the calcium content is mainly based on the calcium content in the phosphate source, but it is always possible to add some calcium as necessary.

Advantageously, the process according to the present invention comprises the steps of:

an acid attack in 1, 2 or several attack tanks with sulphuric acid of said phosphate source during a predetermined time period ranging from 20 to 180 minutes with formation of a first suspension containing a first solid matter and a first liquid phase in which the first solid matter is in suspension, said first solid matter comprising at least calcium phosphate and impurities, said first liquid phase comprising phosphoric acid and dissolved monocalcium phosphate, said attack being conducted in input conditions wherein the molar ratio of the sulphate from the sulphuric acid and possibly from the phosphate source to the calcium present in the phosphate source is comprised between 0.6 and 0.8 and the $P_2O_5$ content in the attack tank or tanks is of less than 6%, a first filtration of said first slurry with a separation of said first solid matter from said first liquid phase, and a retrieval from said first liquid phase of a purified phosphate-based compound.

The molar ratio $SO_4/Ca$ defines the quantity of acid required for the attack of the phosphate source containing the Ca at the input of the reagents in the attack tank or attack tanks.

Advantageously, the process according to the present invention comprises the steps of:

an acid attack in 1, 2 or several attack tanks with sulphuric acid of said phosphate source during a predetermined time period ranging from 20 to 180 minutes with formation of a first suspension containing a first solid matter and a first liquid phase in which the first solid matter is in suspension, said first solid matter comprising at least calcium phosphate and impurities, said first liquid phase comprising phosphoric acid and dissolved monocalcium phosphate, said attack being conducted in input conditions wherein the molar ratio of the sulphate from the sulphuric acid and possibly from the phosphate source to the calcium is comprised between 0.6 and 0.8 and the $P_2O_5$ content in the attack tank or tanks is of less than 6%, a first filtration of said first slurry with a separation of said first solid matter from said first liquid phase, and a retrieval from said first liquid phase of a purified phosphate-based compound.

The molar ratio $SO_4/Ca$ defines the quantity of acid required for the attack of the phosphate source containing the Ca at the input of the reagents in the attack tank or attack tanks.

Advantageously, said step a) of acid attack comprises:

an acid attack in one attack tank, or an acid attack in a first attack tank with addition of sulfuric acid and transfer of said first suspension formed or being formed in the first attack tank to a second attack tank without addition of sulfuric acid, or an acid attack in two successive attack tanks with addition of sulfuric acid in the two tanks, or an acid attack in three attack tanks, or an acid attack in a first attack tank with addition of sulfuric acid and transfer of said first suspension formed or being formed in the first attack tank to a second and a third attack tank without addition of sulfuric acid, or an acid attack in a first attack tank and a second attack tank with or without an addition of sulfuric acid and transfer of said first suspension formed or being formed in the first attack tank and the second attack tank to a third attack tank without addition of sulfuric acid.

In one particular embodiment of the present invention, the process according to the present invention comprises the steps of:

an acid attack in an attack tank with sulphuric acid of said phosphate source during a predetermined time period ranging from 20 and 180 minutes with formation of a first suspension containing a first solid matter and a first liquid phase in which the first solid matter is in suspension, said first solid matter comprising at least calcium phosphate and impurities, said first liquid phase comprising phosphoric acid and dissolved monocalcium phosphate, said attack being conducted in input conditions wherein the molar ratio of the sulphate from the sulphuric acid and possibly from the phosphate source to the calcium present in the phosphate source is comprised between 0.6 and 0.8 and the $P_2O_5$ content in the attack tank is of less than 6%, a first filtration of said first slurry with a separation of said first solid matter from said first liquid phase, and a retrieval from said first liquid phase of a purified phosphate-based compound.

The molar ratio $SO_4/Ca$ defines the quantity of acid required for the attack of the phosphate source containing the Ca at the input of the reagents in the attack tank.

In one embodiment, the phosphate source does not comprise any calcium. By "phosphate source that does not comprise calcium" it is meant a calcium content of 10% by weight or less, preferably of 5% by weight or less, preferably of 1% by weight or less, more preferably of 0.1% by weight or less, and even more preferably of less than 0.05% by weight with respect to the total weight of the dry matter of the phosphate source (105° C. dry).

Phosphate sources that do not contain calcium can be of mineral or organic origin, such as, for example, the anaerobic digestate ashes of organic waste, such as for example manure, the sludge of wastewater treatment plants, compost, dung, residues from the metal industry or from the chemical industry, including phosphate chemistry, food chemistry, the sludge of wastewater plants, guano, manure, dung, and organic waste. They can also be found in the form of iron, aluminium, led, zinc and magnesium phosphates. In this embodiment, calcium is added to the phosphate source to achieve a $SO_4/Ca$ molar ratio ranging from 0.6 to 0.8 in the attack tank.

Surprisingly, it appeared that the combination of strongly sub-stoichiometric conditions (small quantity of sulphuric acid to attack the source of phosphate) with a reduced attack time period can be implemented to produce a purified compound containing easily-recoverable and economically-viable phosphate, while the concentration of $P_2O_5$ in the attack tank or tanks is reduced, but still features a sufficient level of purity to be involved in subsequent productions, including without being limited to, the production of foodgrade DCP at an industrial scale. Consequently, in the process according to the present invention, the extraction of $P_2O_5$ from numerous phosphate sources is optimal, regardless of whether or not the phosphate sources have a high phosphate concentration. This means that once the process is implemented in a production site, the industrialist can exploit conventional rocks featuring a high calcium phosphate concentration, but also rocks with a lower concentration of calcium phosphate or any secondary product containing calcium phosphate.

By using the molar ratio of the sulphate from the sulphuric acid and possibly from the phosphate source to the calcium present in the phosphate source ranging from 0.6 to 0.8, the ratio of solid matter to liquid phase is low, i.e. the suspension density is low. The sulphate present in the attack tank or in the attack tanks comes primarily from the rocks but it can also come from the phosphate source and possibly from the dilution water. Indeed, the content of solid matter in the attack tank or tanks is typically of less than 16%, preferably ranging from 4% to 15%, thereby providing a suspension instead of a slurry and the presence of a low content of solid matter, which is typically counter-intuitive in a treatment process of a phosphate source wherein the attack period is short, the sulphuric acid is diluted, and the filtration step is necessary.

In the process according to the present invention, the reaction is sub-stoichiometric, according to the reaction $Ca_3(PO_4)_2 + 2\ H_2SO_4 + H_2O \rightarrow 2\ CaSO_4 \cdot 2H_2O + Ca(H_2PO_4)_2$ with a theoretical $SO_4/Ca$ molar ratio of around 0.66.

By the implementation of a molar ratio of the sulphate from the sulphuric acid and possibly from the source of phosphate to the calcium present in the phosphate source ranging from 0.6 to 0.8 as close as possible to the theoretical $SO_4/Ca$ ratio, the attack conditions enable to remain mainly under the precipitation curve of calcium with the phosphate ion and therefore to produce MCP that is soluble in the acid liquid phase, where the extraction yield of $P_2O_5$ was measured at more than 90%.

In a particular embodiment, the molar ratio of the sulphate from the sulphuric acid and possibly from the phosphate source to the ranges from 0.6 to 0.8 can be obtained by addition of calcium in the system if the phosphate source does not contain calcium.

By the terms "acid attack using a mineral acid, preferably a sulphuric acid from a phosphate source for a predetermined time period" it is understood that the predetermined time period is the average time spent in one or several attack tanks, for a batch attack or a continuous attack, with possibly a recycling phase, as mentioned below.

In the process according to the present invention, the first solid matter includes non-attacked calcium phosphate and calcium sulphate (calcium sulphate hemihydrate, anhydrite or gypsum) and impurities. Calcium sulphate being mainly present in the form of gypsum (calcium sulphate dihydrate).

The term "monocalcium phosphate" is used to describe a compound with the formula $Ca(H_2PO_4)_2$ (MCP) known under several names, such as monocalcium phosphate, monobasic calcium phosphate, calcium biphosphate, calcium acid phosphate, acid calcium phosphate, mono basic calcium phosphate, calcium dihydrogen phosphate.

Advantageously, the predetermined time period is of less than 120 minutes, preferably of less than 90 minutes, even more preferably of less than 60 minutes and in particular of less than 45 minutes, and even more particularly of approximately 30 minutes.

As can be seen the predetermined time period during which the acid attack occurs can be reduced to reach attack times as short as 60 minutes, in particular of 45 minutes, and even of 30 minutes.

In one specific embodiment, the content of $P_2O_5$ in the attack tank or tanks is of less than 5%, preferably ranging from 0.5 to 4% in $P_2O_5$ and preferably ranging from 1.5 to 3%.

Indeed, in the process according to the present invention, the content of $P_2O_5$ is relatively low in the attack medium, but eventually it is sufficiently pure, unexpectedly, to be recovered as phosphate-based purified compounds.

In another preferred embodiment of the process according to the present invention, said attack is carried out at ambient temperature.

In a preferred embodiment of the process according to the present invention, said attack is conducted at a temperature in the attack tank or tanks of 90° C. or less, preferably of 80° C. or less, preferentially of 75° C. or less, more preferentially still of 60° C. or less, preferably of more than 40° C.

Indeed, in the present invention, it has been observed that it is possible to treat the rock by an acid attack at a generally low temperature, certainly ranging from 40 to 60° C., which removes the need for a heat input and further lowers the production costs from the perspective of energy costs, while using a diluted sulphuric acid, thereby reducing $SO_3$ residues in the purified phosphate-based compound.

Advantageously, the sulphuric acid is diluted sulphuric acid, in particular before being added to the attack tank(s), which reduces phosphate treatment costs, both for sources with a high phosphate concentration and with a low phosphate concentration, while also reducing the content of $SO_3$ in the liquid phase.

Advantageously, in the process according to the present invention, said diluted sulphuric acid features a concentration of $H_2SO_4$ of less than 14% in weight, preferably of 13% or less, preferably of 10% or less, more particularly ranging from 0.5 to 9% by weight, preferably ranging from 3 to 7% and even more preferably of around 5% by weight, with respect to the total weight of the diluted sulphuric acid.

In another embodiment, the sulphuric acid is concentrated sulphuric acid, and in particular it is to be diluted in the attack tank or tanks, wherein the dilution water can be drinking water, river water, sea water, recycled water or water resulting from the production of DCP.

As mentioned previously, the molar ratio of the sulphate from the sulphuric acid and possibly from the phosphate source to the calcium present in the phosphate source ranges from 0.6 to 0.8, which is sufficiently low to come close to the optimum of the theoretical ratio and to maintain the MCP and the phosphoric acid in the liquid phase. The challenge is to achieve calcium sulphate solubility without precipitating the calcium phosphate. Consequently, when advantageously the sulphuric acid is diluted and features a concentration of $H_2SO_4$ of less than 14%, preferably of 10% or less, and even ranging from 0.5 to 9% by weight with respect to the total weight of the diluted sulphuric acid, the optimum is achieved, along with the short predetermined duration of the acid attack, by the reduction of the risk of precipitating the calcium with phosphate ions in a solution and thereby favouring the formation of MCP and of phosphoric acid in the attack tank or tanks in the liquid phase and not in a precipitated form since the reaction medium in the attack tank or tanks is sufficiently diluted to prevent the precipitation of calcium phosphate salts. Only calcium sulphate, preferably gypsum, precipitates in quantities below that of traditional processes to attack phosphate sources. Consequently, in a process according to the present invention, it is possible to use a weak retrieved or recycled acid.

In the process according to the present invention, the sulphuric acid can be diluted sulphuric acid recycled from existing flows of the phosphate industry, the metal industry, the chemical industry. For example, the liquid phase retrieved after the production of DCP by precipitation can be recycled to dilute the attack sulphuric acid solution. Preferably, the attack sulphuric acid is stored in a storage tank. The attack sulphuric acid can therefore come from the recycling of other steps, or be obtained by dilution of the concentrated acid, such as for example sulphuric acid concentrated at 98% or less, which can be diluted with water or with the liquid phase retrieved for example after the production of DCP by precipitation (second liquid phase Preferably, the dilution of the sulphuric acid is performed in the pipes, during the filling of the attack tank(s).

More particularly, in the process according to the present invention, said molar ratio of the sulphate from the sulphuric acid and possibly from the phosphate source to the calcium present in the phosphate source ranges from 0.68 to 0.78, preferably from 0.7 to 0.75 at the input.

More particularly, in the process according to the present invention, said molar ratio of the sulphate from the sulphuric acid and possibly from the phosphate source to the calcium ranges from 0.68 to 0.78, preferably from 0.7 to 0.75 at the input.

Preferably, the process according to the present invention includes the addition of a base to said first suspension, before filtration.

The addition of the base to the first suspension enables to precipitate the calcium fluoride before filtration (pre-neutralisation), which can be advantageous depending on the required final compounds and their intended use. If the added base is a calcium base, such as quicklime or slack lime, in a powder form or as lime milk, or even as limestone, the formation of gypsum before filtration is favoured, which reduces the residual $SO_3$ content in the liquid phase.

In another embodiment, the process according to the invention comprises, before said step whereby said phosphate-based purified compound is retrieved from said first liquid phase, the addition of a base to said first liquid phase after filtration with the formation of a second suspension comprising a second solid matter in suspension in a second liquid phase and a filtration of said second suspension to separate said second solid matter in suspension from said second liquid phase, said second phosphate-based purified compound thereby being retrieved from said second liquid phase from the first liquid phase with a low content of said second solid matter, which is primarily calcium fluoride.

In this embodiment, if a base has been added prior to filtration, the calcium fluoride has been eliminated during filtration and is present in the first solid matter, regardless of whether the required phosphate-based purified compound is DCP or MCP and phosphoric acid. The production of DCP relies on the addition of a calcium base to the MCP (neutralisation) which causes the calcium fluoride to precipitate if it has not been removed beforehand.

If no base has been added before the filtration of the first suspension, said solid matter contains essentially calcium sulphate (calcium sulphate hemihydrate, anhydrite or gypsum), impurities and non-attacked phosphate, whereas the fluorine is still in the first liquid phase.

When the base is added in a controlled manner to the liquid phase featuring a substantially lowered solid matter content, but still containing fluorine, the calcium fluoride can be selectively eliminated. In this case, different steps can be subsequently considered.

If said phosphate-based purified compound thus retrieved from the second liquid phase that is to be produced is MCP and/or phosphoric acid, the second liquid phase is retrieved and processed for that purpose.

If said phosphate-based purified compound thus retrieved from the second liquid phase that is to be produced is DCP, the second liquid phase is processed by the subsequent addition of a calcium base, such as quicklime or slack lime, in powder form or as lime milk, or as limestone. In this case, a third suspension is formed following the addition of a calcium base to the second liquid phase, featuring a low fluoride content, which is then filtered to retrieve the third solid phase containing the DCP.

Of course, when the DCP can contain fluorine or when the used phosphate source does not contain fluorine, the second suspension is formed by the addition of a calcium base, such as quicklime, slack lime, lime powder or lime milk, or even limestone, to the first liquid phase, which is then filtered to separate on one hand the second solid matter that contains the DCP and, on the other hand, the second liquid phase that forms the residual water, which can be recycled to form the sulphuric acid solution for the acid attack of the phosphate source of for the dilution of the attack tank(s). In this case, the controlled addition of the base to selectively precipitate the fluoride is not required.

In a particular and preferred embodiment, a base is added before filtration of the first solid matter to precipitate the fluorides and eliminate them from the first liquid phase with the calcium sulphate and the non-attacked calcium phosphate. The first liquid phase is then subsequently treated by adding a calcium base, such as quicklime or slack lime, lime in a powder form or lime milk, or even as limestone, to form a second suspension containing precipitated DCP as a second solid matter, which is then retrieved from the second suspension by filtration, centrifugation, decantation or any other solid-liquid separation method.

Regardless of whether the DCP is formed from the first liquid phase or from the second liquid phase, a stoichiometric quantity of the calcium base, as mentioned above, is added to the first liquid phase or to the second liquid phase, for example in a neutralisation reactor to precipitate the DCP, preferably with a pH controlled up to a value ranging from 5 to 6.

A preferable manner of precipitating the DCP is to add to the first liquid phase or to the second liquid phase finely-ground limestone to neutralise the liquid phase that contains MCP and phosphoric acid. Neutralisation is preferably performed for at least 30 minutes to complete the neutralisation reaction and the release of $CO_2$. In a preferred embodiment, to obtain a pH value ranging from 5 to 6, lime milk is added to ensure the full precipitation of the DCP, and thereby to extract all the $P_2O_5$ in the residual liquid.

More particularly, in the process according to the present invention, said solid matter being separated from said first liquid phase is recycled in part or in full by the introduction of the first suspension.

Indeed, it can be advantageous to increase the solid matter content in the first suspension, either in the attack tanks, or in the filtration device, to aid with its filtration or to be able to treat the residual calcium phosphate present in the first solid matter. The first suspension containing calcium sulphate and possibly calcium fluoride is preferably retrieved by any liquid/solid separation method such as a filtration device, a rotating filter manufactured by the applicant, by centrifugation, by decantation, by hydrocyclone, or band filter in order to separate the first solid matter from the first liquid phase. The first liquid phase is a diluted solution of $P_2O_5$ containing a slight sulphate excess, for example ranging from 0.05 to 0.6%, and preferably from 0.1 to 0.25%.

During filtration, cleaning with water can be performed on the filtration device to move the interstitial water of the filter cake and to retrieve trace amounts of $P_2O_5$ remaining in the calcium sulphate cake. The calcium sulphate is cleaned and separated. However, before performing this operation, the sulphate calcium is recycled in the attack tank or tanks to improve the attack conditions of the phosphate source and thereby to improve the precipitation of the calcium sulphate forming the first solid matter and to facilitate its filtration.

Recycling operations can therefore be envisaged by recycling a part of the cleaned calcium sulphate towards the attack tank(s) to increase the suspension density of the calcium sulphate significantly beyond 10% by weight with respect to the total weight of the suspension.

Recycling can also be envisaged by installing a thickener of the first suspension before separation, allowing for a part of the thickened suspension to be sampled and returned to the attack tank(s).

This recycling increases the density of the solid matter in the suspension or in the attack tank or tanks and facilitates the elimination of the calcium sulphate excess saturation from the medium and or the attack tanks; this prevents the uncontrolled germination of this suspension and enables to obtain crystallised calcium sulphate particles in the first suspension. This recycling also prevents reactions blocking the attack reaction of the mineral by the sulphuric acid.

In another embodiment according to the present invention, said second solid matter separated from said second liquid phase is recycled by introduction in said first suspension and in said second suspension. Preferably, when said second solid matter is calcium fluoride, it is not recycled.

For this purpose, in certain cases, if the filtration is complicated because of the low solid matter content, it can be advantageous to increase the solid matter content by introducing the second solid matter in the first suspension or in the second suspension, for example to add crystallisation seeds.

Indeed, when DCP is produced, the suspension that contains it is filtered or centrifuged to separate the DCP from the liquid phase. As the liquid phase is practically water, there is no need to clean the separated DCP cake and the liquid phase can be advantageously recycled in the sulphuric acid tank, in the pipes or directly in the attack tank or tanks. In some cases, when the purification of the first liquid phase is properly conducted, the impurity quantity is reduced, which favours the implementation of the recycling of the liquid phase retrieved following the isolation of the DCP.

Preferably, said phosphate source is defined as any organic or mineral matter containing phosphate comprising at least 45% by weight of $P_2O_5$ with respect to the total weight of the dry matter (105° C. dry); preferably of 40% or less, preferably of 30% or less, preferably 20% or less and preferably 10% or less. In this phosphate source, the calcium can be bonded or not to the phosphate, hydrogen phosphate and/or dihydrogen phosphate ion. Said source can be chosen from the group of traditional phosphate rocks, phosphate rocks with a low content of $P_2O_5$, ashes of various mineral or organic origins, such as, for example, the anaerobic digestate ashes of organic waste, such as for example manure, the sludge of wastewater treatment plants, compost, dung, residues from the metal industry or from the chemical industry, including phosphate chemistry, food chemistry, the sludge of wastewater plants, guano, bone ash, manure, dung, and organic waste.

In another embodiment, the phosphate sources do not contain any calcium. For example, the calcium content of the phosphate source in this embodiment is of 5% by weight, preferably of 1% by weight, preferably still of 0.1% by weight or less with respect to the total weight of the dry matter (105° C. dry). These phosphate sources include iron phosphate, aluminium phosphate or organic phosphates. In this mode, calcium can be added as lime, as lime milk, as calcium carbonate, as calcium chloride and possibly as phosphate rocks containing calcium. The molar ratio of sulphate from sulphuric acid and possibly from the phosphate source to added calcium ranges from 0.6 to 0.8.

Generally speaking, in the event of a calcium deficiency, calcium can be added as lime, as lime milk, as calcium carbonate, as calcium chloride and possibly as phosphate rocks containing calcium.

The term "traditional phosphate rock" is used, in the present invention, to describe a rock that features a typical $P_2O_5$ analysis greater than 25% and that can be enhanced or not, i.e. it undergoes several physicochemical treatments (grinding, sieving, cleaning, flotation) to increase the titration ($P_2O_5$) of the rock.

The term "phosphate rock with a low content of $P_2O_5$" is used, in the present invention, to describe a typical $P_2O_5$ analysis of less than 25%, and preferably of 20%.

The term "ashes, sludge from wastewater processing plants, bone ash, manure or any raw material that features a phosphate content of 40% or less by weight of $P_2O_5$ with respect to the total weight of the raw material" is taken to describe secondary phosphate sources, which are generally difficult to recover, such as the ashes from the sludge of wastewater processing plants, plant material (wood, wheat bran), ashes from a knackery, co-products from the incineration of waste or of biomass for power production purposes.

More particularly, in the process according to the present invention, said purified phosphate-based compound is a monocalcium phosphate MCP, a dicalcium phosphate DCP, more particularly a foodgrade dicalcium phosphate DCP (for human or animal consumption), a phosphoric acid and its derivatives, such as an acid derived directly from said first liquid phase or a phosphoric acid produced from said DCP.

The term "dicalcium phosphate (DCP)" is used to describe dibasic calcium phosphate or dicalcium phosphate with the formula $CaHPO_4$, which can be in an anhydrous form (DCPA) or dihydrated form (DCPD).

By the term "foodgrade dicalcium phosphate (DCP)" it is understood any DCP for animal consumption (in particular in terms of Feed Grade and Pet Food), for human consumption and for the dental and oral care industry.

In a preferred embodiment of the process according to the present invention, said second liquid phase is recycled by introduction in said attack tank or said attack tanks.

Other embodiments of the process according to the invention are indicated in the appended claims.

The invention also relates to a dicalcium phosphate DCP, in an anhydrous form or in a dihydrated form, featuring a chloride content of 0.025% or less by weight with respect to the total weight of said dicalcium phosphate, and/or a fluoride content of 2% or less by weight with respect to the total weight of said dicalcium phosphate, and/or a content of $Na_2O$ of 0.15% or less by weight, with respect to the total weight of said dicalcium phosphate.

More particularly, the invention relates to a dicalcium phosphate DCP, in an anhydrous form or in a dihydrated form, featuring a chloride content of 0.02% or less by weight with respect to the total weight of said dicalcium phosphate, and/or a fluoride content of 1% or less by weight with respect to the total weight of said dicalcium phosphate, in particular as additives for animal feed.

Alternately, the present invention relates to a dicalcium phosphate DCP, in an anhydrous form or in a dihydrated form, featuring a chloride content of 0.02% or less by weight with respect to the total weight of said dicalcium phosphate, more particularly as a fertiliser ingredient or as a source of phosphate that is attacked for the purpose of producing phosphoric acid.

Other embodiments of the dicalcium phosphate according to the invention are indicated in the appended claims.

The present invention also relates to a use of dicalcium phosphate DCP, in an anhydrous form or in a dihydrated form, featuring a chloride content of 0.02% or less by weight with respect to the total weight of said dicalcium phosphate, and a fluoride content of 1% or less by weight with respect to the total weight of said dicalcium phosphate according to the present invention, in animal feed, in particular for the feed grade (cattle, fowl, aquaculture, pig farming) and for pets.

The present invention also relates to a use of dicalcium phosphate DCP, in an anhydrous form or in a dihydrated form, featuring a chloride content of 0.02% or less by weight with respect to the total weight of said dicalcium phosphate, more particularly as an ingredient according to the invention, for a fertiliser or as a phosphate source for the production of phosphoric acid.

The present invention also relates to a dicalcium phosphate DCP, in an anhydrous form or in a dihydrated form, obtained by the process according to the present invention.

Advantageously, the dicalcium phosphate DCP, in an anhydrous form or in a dihydrated form, obtained by the process according to the present invention features a chloride content of 0.025% or less by weight with respect to the total weight of said diaclium phosphate, and/or a fluoride content of 2% or less by weight with respect to the total weight of said dicalcium phosphate, and/or a content of $Na_2O$ of 0.15% or less by weight, with respect to the total weight of said dicalcium phosphate.

More particularly, the dicalcium phosphate DCP, in an anhydrous or dihydrated form, obtained by the process according to the invention features a chloride content of 0.02% or less by weight with respect to the total weight of said dicalcium phosphate.

Advantageously, the dicalcium phosphate DCP, in an anhydrous or dihydrated form, obtained by the process according to the present invention features a fluoride content of 1% or less by weight with respect to the total weight of said dicalcium phosphate.

Other features, details and advantages of the invention will become apparent from the description given hereafter, with reference to the examples and not limited thereto.

The process according to the present invention features a series of advantages allow for the implementation of a competitive process. Indeed, it makes it possible to use diluted sulphuric acid with a concentration for example of less than 14%, preferably between 0.5 and 10%, in particular between 1 and 7%, more particularly between 2 and 5%, more specifically between 3 and 4% by weight with respect to the total weight of the diluted sulphuric acid, or a recycled sulphuric acid, which reduces the cost of raw materials. Without limitation, it can be used to attack various phosphate sources, such as rocks with a low content of $P_2O_5$ or secondary phosphorous sources.

By working in sub-stoichiometric conditions according to the present invention with a $SO_4/Ca$ ratio between for example 0.68 and 0.8, it is possible to achieve savings of 20 to 25% in $H_2SO_4$ and an extraction efficiency advantageously of more than 85%, and preferably of more than 90%.

The attack time is relatively short, down to 90 minutes or less, for example between 30 and 60 minutes.

The attack temperature is also relatively low with respect to a traditional attack process, such as for example between 40° C. and 60° C. compared with a traditional temperature of between 75° C. and 95° C., which makes it possible to achieve good energy savings.

The content of $P_2O_5$ in the liquid phase in the first suspension preferably ranges between 1 and 5%, in particular between 1.5 and 3.5%, and even between 2 and 3% by weight with respect to the total weight of the first liquid phase.

The process according to the present invention can further be used to achieve a purification rate of more than 50%, preferably of more than 60% by weight in As, Al, U, Th, and Na with respect to the initial weight of these elements contained in the phosphate source.

More particularly, the present invention relates to, without limitation, a DCP, for example obtained by the process according to the present invention and featuring chloride and fluoride contents that are suitable for applications in food for human or animal consumption, i.e. a content in chloride of less than 0.025%, and even reaching a content as low as 1 ppm and a content in fluoride of less than 2%, and even reaching a content as low as 0.1% by weight with respect to the total weight of the DCP.

Preferably, the DCP includes a low content in residual $SO_3$ due to the highly-diluted sulphuric acid attack. The $Na_2O$ content is also of less than 0.15% by weight with respect to the total weight of DCP in certain embodiments.

In an advantageous DCP product, the MgO content is also of less than 1% by weight with respect to the total weight of the DCP.

More particularly, an advantageous DCP according to the present invention features a Sr content of less than 100 ppm; preferably of less than 50 ppm, more particularly of less than 10 ppm, more specifically of less than 1 ppm with respect to the DCP.

The DCP according to the present invention further features a Th content typically of less than 5 ppm with respect to the DCP. Similarly, the Mn content in the DCP according to the present invention is of less than 10 ppm with respect to the DCP.

Typically, the Mo content in the DCP according to the present invention is of less than 2 ppm with respect to the DCP.

Finally, the DCP according to the present invention preferably features a $U_3O_8$ content of less than 32 ppm.

Another purpose of the invention is to create a dicalcium phosphate DCP composition comprising
 a) a CaO content of 40% or more by weight with respect to the total weight of dicalcium phosphate,
 b) a chloride content of 0.020% or less by weight with respect to the total weight of dicalcium phosphate,
 c) a fluoride content of 2% or less by weight with respect to the total weight of dicalcium phosphate,
 d) a $Na_2O$ content of 0.15% or less by weight with respect to the total weight of the dicalcium phosphate.

As can be seen, the DCP according to the present invention features the required qualities to be used in human and animal foodstuffs, and in technical applications.

EXAMPLES

Example 1

Attack of a Phosphate Source at the Laboratory Scale 100 g of a phosphate source (phosphate rock) containing 30.5 g of $P_2O_5$, 49.5% of CaO equivalent, 3.95% of fluorine, 0.308% of $Fe_2O_3$ equivalent, 0.547% of $Al_2O_3$ equivalent and 0.303% of MgO, equivalent, by weight with respect to the weight of the phosphate source are brought into contact with sulphuric acid diluted to a concentration of 2% during a 30-minute attack period, at an attack temperature of 60° C. and with a $SO_4/Ca$ molar ratio of 0.8. The $SO_4/Ca$ molar ratio defines the quantity of acid required for the attack of the phosphate source containing the Ca at the inlet of the attack tank.

Once the additives have been added, the composition is left to stir for half-an-hour before filtration.

The suspension is then filtered in a vacuum on a Büchner funnel. The different quantities thus obtained are recorded and the calcium phosphate and liquid phase products are analysed.

In the laboratory protocol, this is a batch process, without cleaning. However, the cleaning was extrapolated and the quantity of $P_2O_5$ in the impregnation liquid of the filtration cake was calculated.

The attack yield is calculated with the following calculation: (Mass of $P_2O_5$ in the filtrate+mass of $P_2O_5$ in the impregnation liquid of the filtration cake)/(total mass of $P_2O_5$ in the phosphate source). The $P_2O_5$ content in the impregnation liquid corresponds with the $P_2O_5$ that is recoverable by cleaning of the cake in an industrial process.

The quantity of added diluted sulphuric acid is of 3499 g for a $SO_4$ content of 70.2 g. The $SO_4$/Ca ratio if of 0.8 due to the calcium content of the phosphate source.

The retrieved liquid phase has a volume of 3.09 litres for a weight of 3125 g, and a pH of 2.1. The $P_2O_5$ content in the liquid phase is of 0.83% and the $SO_3$ content is of 0.16% by weight with respect to the total weight of the liquid phase. The mass of $P_2O_5$ in the impregnation liquid is of 1.2 g.

The $CaO/P_2O_5$ molar ratio in the first solution is of 0.58, whereas the residual CaO content in the liquid phase is of 0.19% by weight with respect to the weight of the liquid phase.

The yield of the attack in $P_2O_5$ is of 89%. As can be seen, despite the use of sulphuric acid at a low concentration of 2% and sub-stoichiometric attack conditions with a total attack period of just 30 minutes, the attack yield in $P_2O_5$ is significantly high.

Example 2

Attack of a Phosphate Source at the Laboratory Scale 150 g of a phosphate source (rock) containing 15.8 g of $P_2O_5$, 27.6% of CaO equivalent, 2.2% of fluorine, 2.37% of $Fe_2O_3$ equivalent, 2.88% of $Al_2O_3$ equivalent and 0.416% of MgO, equivalent, by weight with respect to the weight of the phosphate source are brought into contact with sulphuric acid diluted to a concentration of 5% during a 30-minute attack period, at an attack temperature of 40° C. and with a $SO_4$/Ca molar ratio of 0.8 according to the protocol of example 1:

The quantity of added diluted sulphuric acid is of 1131 g for a $SO_4$ content of 61.0 g. The $SO_4$/Ca ratio if of 0.8 due to the calcium content of the phosphate source.

The retrieved liquid phase has a volume of 0.955 litres for a weight of 976 g, and a pH of 1.8. The $P_2O_5$ content in the liquid phase is of 1.97% and the $SO_3$ content is of 0.27% by weight with respect to the total weight of the liquid phase. The mass of $P_2O_5$ in the impregnation liquid is of 3.24 g.

The $CaO/P_2O_5$ molar ratio in the first solution is of 0.43, whereas the residual CaO content in the liquid phase is of 0.33% by weight with respect to the weight of the liquid phase.

The yield of the attack in $P_2O_5$ is of 95%. As can be seen, despite the use of sulphuric acid at a low concentration of 5% and a phosphate source with a very low phosphate content, in sub-stoichiometric attack conditions with a total attack period of just 30 minutes, the attack yield in $P_2O_5$ is significantly high.

Example 3

Attack of a Phosphate Source at the Laboratory Scale 100 g of a phosphate source (phosphate rock) containing 30.5 g of $P_2O_5$, 49.5% of CaO equivalent, 3.95% of fluorine, 0.308% of $Fe_2O_3$ equivalent, 0.547% of $Al_2O_3$ equivalent and 0.303% of MgO, equivalent, by weight with respect to the weight of the phosphate source are brought into contact with sulphuric acid diluted to a concentration of 5% during a 30-minute attack period, at an attack temperature of 60° C. and with a $SO_4$/Ca molar ratio of 0.8 according to the protocol of example 1:

The quantity of added diluted sulphuric acid is of 1398 g for a $SO_4$ content of 70.1 g. The $SO_4$/Ca ratio if of 0.8 due to the calcium content of the phosphate source.

The retrieved liquid phase has a volume of 1.13 litres for a weight of 1161 g, and a pH of 2.2. The $P_2O_5$ content in the liquid phase is of 2% and the $SO_3$ content is of 0.20% by weight with respect to the total weight of the liquid phase. The mass of $P_2O_5$ in the impregnation liquid is of 2.6 g.

The $CaO/P_2O_5$ molar ratio in the first solution is of 0.38, whereas the residual CaO content in the liquid phase is of 0.30% by weight with respect to the weight of the liquid phase.

The yield of the attack in $P_2O_5$ is of 85%. As can be seen, despite the use of sulphuric acid at a low concentration of 5% and sub-stoichiometric attack conditions with a total attack period of just 30 minutes, the attack yield in $P_2O_5$ is significantly high.

Comparative Example 1

Attack of a Phosphate Source at the Laboratory Scale 100 g of a phosphate source (phosphate rock) containing 30.5 g of $P_2O_5$, 49.5% of CaO equivalent, 3.95% of fluorine, 0.308% of $Fe_2O_3$ equivalent, 0.547% of $Al_2O_3$ equivalent and 0.303% of MgO, equivalent, by weight with respect to the weight of the phosphate source are brought into contact with sulphuric acid diluted to a concentration of 5% during a 30-minute attack period, at an attack temperature of 60° C., but in this case with a $SO_4$/Ca molar ratio of 1 according to the protocol of example 1:

The quantity of added diluted sulphuric acid is of 1747 g for a $SO_4$ content of 87.2 g. The $SO_4$/Ca ratio if of 1 due to the calcium content of the phosphate source.

The retrieved liquid phase features a volume of 1.4 litres for a weight of 1429 g, and a pH of 2.1. The $P_2O_5$ content in the liquid phase is of 1.63% and the $SO_3$ content is of 0.61% by weight with respect to the total weight of the liquid phase. The mass of $P_2O_5$ in the impregnation liquid is of 3.5 g.

The $CaO/P_2O_5$ molar ratio in the first solution is of 0.26, whereas the residual CaO content in the liquid phase is of 0.17% by weight with respect to the weight of the liquid phase. The yield of the attack in $P_2O_5$ is of 88%. As can be seen in the comparative example under stoichiometric conditions, the specific consumption of sulphuric acid is greater for similar levels of attack yield. The consumption of the calcium source required for neutralisation is also more significant.

Example 4

Sub-Stoichiometric Attack of a Phosphate Rock at the Scale of the Pilot Project

The pilot project comprises 3 stirred tanks that are thermostated with oil-heated double shells. The tanks are successive overflow tanks; the first two tanks have a 20-litre capacity and the third tank features a 30-litre capacity and serves only as a buffer before filtration.

10 litres of water are poured into the first tank and are heated to working temperature. The phosphate source and the diluted sulphuric acid are added in the first reactor at flows that correspond with the required attack conditions ($SO_4$/CaO ratio, attack duration $H_2SO_4$ concentration for the attack of the phosphate source, $P_2O_5$ content in the attack tank).

The produced suspension overflows into the second reactor. The second reactor is configured to perform a neutralisation prior to filtration. Neutralisation prior to filtration is not systematically performed.

The suspension finally overflows into the third reactor that supplies the filtration unit.

The suspension quantity is filtered every 30 minutes. Two types of filtration are alternately performed:

Filtration for recycling purposes in the attack reactor: the filtration cake is not cleaned and it is recycled in the first (attack) reactor to increase the proportion of solids in the reaction medium. The liquid phase (filtrate) is poured into a vat and stored for the neutralisation and DCP production step. This filtration step is certainly not required at the industrial scale. Naturally, it can be performed, but it is not necessary. At the pilot project scale, this step can advantageously be performed as it is preferable to increase the solid matter content in the attack reactor.

Filtration for the production of calcium sulphate: in this case, the calcium sulphate cake is cleaned with a predetermined quantity of water to retrieve the $P_2O_5$ contained in the impregnation liquid. The liquid phase and the cleaning filtrate are poured into the filtrate retrieval vat. The calcium sulphate is unloaded for its evacuation.

The installation is in a stable state, the calcium sulphate and liquid phase (filtrates) samples are collected for analyses and the different products are also analysed.

The yield is calculated as follows: mass of $P_2O_5$ in the liquid phase (g/h)/mass of $P_2O_5$ in the phosphate source (g/h).

A phosphate source in the form of a rock containing 30.3% by weight of $P_2O_5$, 47.6% of CaO equivalent, 3,68% of fluorine, 0.144% of $Fe_2O_3$ equivalent, 0.18% of $Al_2O_3$ equivalent and 0.542% of MgO equivalent, by weight with respect to the weight of the phosphate source is added to the attack tank in the presence of sulphuric acid diluted to 10% by weight with respect to the weight of the diluted acid, with a $SO_4$/Ca molar ratio of 0.8. The attack temperature is of 60° C. and the attack duration is of approximately 1 hour. The pH in the attack tank is of 2.04. The flow of the rock is of 2.67 kg/h, and the acid flow is of 17.5 litres/h. The $P_2O_5$ content in the attack suspension is of 4.5% by weight with respect to the total weight of the suspension.

During filtration, the flow of the retrieved liquid phase is of 16.13 kg/h.

The attack yield is of 93%.

As can be seen, the laboratory tests are confirmed by the pilot project, and the attack yield of the phosphate rock in the presence of diluted sulphuric acid and in conditions of low $P_2O_5$ content in the attack tank (<6%) and of a short attack period is particularly high when sub-stoichiometric conditions are implemented.

Example 5

Sub-Stoichiometric Attack of a Phosphate Rock at the Scale of the Pilot Project

The pilot used is the same as in example 4.—and the same process as in example 4.—is implemented.

The same phosphate source as in example 4.—is added to the attack tank in the presence of sulphuric acid diluted to 5% by weight with respect to the weight of the diluted acid, with a $SO_4$/Ca molar ratio of 0.7 owing to the calcium content of the phosphate source. The attack temperature is of 60° C. and the attack duration is of approximately 1 hour. The pH in the attack tank is of 2.5. The flow of the rock is of 3 kg/h, and the acid flow is of 35.6 litres/h. The $P_2O_5$ content in the attack suspension is of 2.32% by weight with respect to the total weight of the suspension.

During filtration, the flow of the retrieved liquid phase is of 35.44 kg/h.

The attack yield is of 94%.

As can be seen, with respect to the example 4.—, despite the presence of sulphuric acid twice as diluted, the $P_2O_5$ yield is even higher.

Example 6

Sub-Stoichiometric Attack of a Phosphate Rock at the Scale of the Pilot Project

The same pilot as in example 4.—is used, the same process as in example 4.—is implemented, with the exception that in the second reactor, i.e. the neutralisation reactor before filtration, the pH has been adjusted to 2.48 by adding $Ca(OH)_2$ lime milk.

A phosphate source in the form of a rock containing 34.9% by weight of $P_2O_5$, 49.8% of CaO equivalent, 3,78% of fluorine, 0.136% of $Fe_2O_3$ equivalent, 0.386% of $Al_2O_3$ equivalent and 0.156% of MgO equivalent, by weight with respect to the weight of the phosphate source is added to the attack tank in the presence of sulphuric acid diluted to 5% by weight with respect to the weight of the diluted acid, with a $SO_4$/Ca ratio of 0.8, due to the calcium content of the phosphate source. The attack temperature is of 60° C. and the attack duration is of approximately 1 hour. The pH in the attack tank is of 2. The flow of the rock is of 2.6 kg/h, and the acid flow is of 35.7 litres/h. The $P_2O_5$ content in the attack suspension is of 2.10% by weight with respect to the total weight of the suspension.

During filtration, the flow of the retrieved liquid phase is of 38.22 kg/h.

The attack yield is of 92%.

Example 7

Sub-Stoichiometric Attack of a Phosphate Rock at the Scale of the Pilot Project

The pilot used is the same as in example 4.—and the same process as in example 4.—is implemented.

A phosphate source in the form of a rock containing 24.90% by weight of $P_2O_5$, 40.5% of CaO equivalent, 2,54% of fluorine, 3.97% of $Fe_2O_3$ equivalent, 1.13% of $Al_2O_3$ equivalent and 1.88% of MgO equivalent, by weight with respect to the weight of the phosphate source is added to the attack tank in the presence of sulphuric acid diluted to 5% by weight with respect to the weight of the diluted acid, with a $SO_4$/Ca ratio of 0.8, due to the calcium content of the phosphate source. The attack temperature is of 60° C. and the attack duration is of approximately 1 hour. The pH in the attack tank is of 1.95. The flow of the rock is of 3.19 kg/h, and the acid flow is of 34.5 litres/h. The $P_2O_5$ content in the attack suspension is of 1.82% by weight with respect to the total weight of the suspension.

During filtration, the flow of the retrieved liquid phase is of 37.91 kg/h.

The attack yield is of 90%.

Example 8

Production of DCP from Phosphate Rocks at the Scale of the Pilot Project

For the production of DCP, the pilot implemented to perform the attack of the rock is used in an uncoupled manner in the first attack. Items of equipment are therefore used sequentially.

The pilot used is the same as in example 4.-. In this example, the liquid phase retrieved from the filtration of example 7 is treated to precipitate the DCP by neutralisation in the following manner:

quicklime (or limestone) is added to the nominal flow in the reactor in which the liquid phase retrieved from the example 7 is also introduced, and the pH is regularly controlled.

When the pH is equal to 5.5/6 the filtrate feed pump is started. The pH is regularly controlled and the limestone or quicklime feed flow is adapted to maintain the pH between 5.5 and 6.

Filtration is conducted every thirty minutes from the buffer tank. Every second time, the filtration cake containing the calcium sulphate is recycled in the first attack reactor to increase the rate of solid matter in the reaction medium.

The production cake containing the precipitated DCP is retrieved and the mother liquors are stored in a vat. Product samples (DCP and mother liquors) are collected for analysis.

The neutralisation temperature is of 60° C., the pH in the first tank is of 4.4, whereas it reaches 5.55 in the second tank. The flow of quicklime is of 1.05 kg/h.

The precipitation yield of the DCP is calculated with the formula ($P_2O_5$ content in the DCP/$P_2O_5$ initially present in the MCP solution and the acid) and the $P_2O_5$ balance of the operation is of 92%.

Comparative Example 2

Sub-Stoichiometric Attack of a Phosphate Rock at the Scale of the Pilot Project

The pilot used is the same as in example 4.—and the same process as in example 4.—is implemented.

The same phosphate source as in example 4.—is added to the attack tank in the presence of sulphuric acid at 20% by weight with respect to the weight of the acid, with a $SO_4$/Ca ratio of 0.8 owing to the calcium content of the phosphate source. The attack temperature is of 60° C. and the attack duration is of approximately 1 hour. The pH in the attack tank is of 1.73. The flow of the rock is of 5 kg/h, and the acid flow is of 15.6 litres/h. The $P_2O_5$ content in the attack suspension is of 7.10% by weight with respect to the total weight of the suspension.

During filtration, the flow of the retrieved liquid phase is of 13.3 kg/h.

The attack yield is of 65%.

As can be seen, with respect to example 4.—, the presence of a sulphuric acid with a greater concentration and a $P_2O_5$ content of more than 6% lower the yield to 65%.

It is understood that the present invention is by no means limited to the embodiments described above and that many modifications may be made thereto without departing from the scope of the appended claims.

The invention claimed is:

1. A process of acid attack of a phosphate source including calcium for the production of a phosphate-based purified compound comprising the steps of:
    a) an acid attack using sulphuric acid of said phosphate source, during a predetermined time period ranging from 20 to 180 minutes with a formation of a first suspension containing a first solid matter and a first liquid phase in which the first solid matter is in suspension, said first solid matter comprising at least calcium phosphate and impurities, said first liquid phase comprising phosphoric acid and dissolved mono-calcium phosphate, said attack being conducted in input conditions wherein the molar ratio of the sulphate from the sulphuric acid and from the phosphate source to the calcium present in the phosphate source ranges from 0.6 to 0.8 and the $P_2O_5$ content is of less than 6% by weight,
    b) a first filtration of said first slurry with a separation of said first solid matter from said first liquid phase, and
    c) a retrieval from said first liquid phase of a purified phosphate-based compound.

2. The process according to claim 1, wherein said acid attack takes place in 1, 2 or more attack tanks.

3. The process according to claim 1, wherein the predetermined time period is from 20 to 120 minutes.

4. The process according to claims 2, wherein the $P_2O_5$ content in the first liquid phase in the attack tank or tanks is less than 5% by weight.

5. The process according to claim 2, wherein said attack is performed at a temperature in the attack tank or tanks of 90° C. or less.

6. The process according to claim 2, wherein the sulphuric acid is a diluted sulphuric acid, before being added in the attack tank or tanks.

7. The process according to claim 6, wherein said diluted sulphuric acid features a $H_2SO_4$ concentration of 13% or less by weight.

8. The process according to claim 1, wherein the molar ratio of sulphate from the sulphuric acid and from the phosphate source to the calcium present in the phosphate source ranges from 0.68 and 0.78.

9. The process according to claim 1, further comprising an addition of a base to said first suspension, prior to filtration.

10. The process according to claim 1, further comprising, before said step whereby said phosphate-based purified compound is retrieved from said first liquid phase, an addition of a base to said first liquid phase after filtration with the formation of a second suspension comprising a second solid matter in suspension in a second liquid phase and a filtration of said second suspension to separate said second solid matter in suspension from said second liquid phase, said second phosphate-based purified compound thereby being retrieved from said second liquid phase from the first liquid phase with a low content of said second solid matter.

11. The process according to claim 1, wherein said phosphate source containing calcium is chosen from: traditional phosphate rocks, phosphate rocks with a low $P_2O_5$ content, ashes, sludge from wastewater processing plants, bone ash, pig manure, chicken manure, ash from the sludge of wastewater processing plants, sludge from wastewater processing plants, and of or a raw material having a phosphate content of less than 30% by weight of $P_2O_5$ with respect to a total weight of the raw material.

12. The process according to claim 1, wherein said purified phosphate-based compound is a monocalcium phosphate MCP, a dicalcium phosphate DCP or a phosphoric acid.

13. The process according to claim 10, wherein said second liquid phase is recycled by introduction in said attack tank or tanks.

* * * * *

UNITED STATES PATENT AND TRADEMARK OFFICE
CERTIFICATE OF CORRECTION

PATENT NO. : 11,407,640 B2
APPLICATION NO. : 16/637254
DATED : August 9, 2022
INVENTOR(S) : A. Wavreille et al.

It is certified that error appears in the above-identified patent and that said Letters Patent is hereby corrected as shown below:

In the Claims

| Column | Line | |
|--------|------|---|
| 20 | 65 | change "plants, and of" to -- plants, --. |

Signed and Sealed this
Twentieth Day of December, 2022

Katherine Kelly Vidal
*Director of the United States Patent and Trademark Office*